United States Patent
Saito et al.

(10) Patent No.: US 7,365,890 B2
(45) Date of Patent: Apr. 29, 2008

(54) COLOR PROCESSING APPARATUS AND METHOD AND IMAGE PROCESSING APPARATUS

(75) Inventors: Kazuhiro Saito, Kanagawa (JP); Hiroshi Mori, Kanagawa (JP); Mitsuru Uratani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 968 days.

(21) Appl. No.: 10/423,876

(22) Filed: Apr. 28, 2003

(65) Prior Publication Data

US 2003/0202197 A1    Oct. 30, 2003

(30) Foreign Application Priority Data

Apr. 30, 2002    (JP)    ............................. 2002-129334

(51) Int. Cl.
G03F 3/00       (2006.01)
H04N 17/00      (2006.01)
H04N 17/02      (2006.01)
H04N 1/54       (2006.01)
H04N 1/60       (2006.01)

(52) U.S. Cl. .................. 358/523; 358/406; 358/504; 358/523; 358/3.23; 358/2.1; 358/515; 358/518; 358/525; 358/530; 345/601; 345/602; 345/603; 345/604; 347/5; 347/19

(58) Field of Classification Search ................ 358/406, 358/504, 523, 3.23, 2.1, 515, 518, 525, 530; 345/601–604; 347/5, 19
See application file for complete search history.

(56) References Cited

U.S. PATENT DOCUMENTS

| | | | | |
|---|---|---|---|---|
| 5,053,866 A | * | 10/1991 | Johnson | 358/504 |
| 5,809,213 A | * | 9/1998 | Bhattacharjya | 358/1.6 |
| 5,982,990 A | * | 11/1999 | Gondek | 358/1.9 |
| 6,178,007 B1 | * | 1/2001 | Harrington | 358/1.9 |
| 6,222,648 B1 | * | 4/2001 | Wolf et al. | 358/504 |
| 6,381,037 B1 | * | 4/2002 | Balasubramanian et al. | 358/3.23 |
| 6,396,595 B1 | * | 5/2002 | Shimazaki | 358/1.9 |
| 6,441,923 B1 | * | 8/2002 | Balasubramanian et al. | 358/3.23 |
| 6,522,778 B1 | * | 2/2003 | Tamagawa | 382/167 |
| 6,585,340 B1 | * | 7/2003 | Borrell | 347/14 |
| 6,873,433 B1 | * | 3/2005 | Statt | 358/1.9 |

(Continued)

FOREIGN PATENT DOCUMENTS

JP    09-284577    10/1997

(Continued)

*Primary Examiner*—Twyler Lamb Haskins
*Assistant Examiner*—Beniyam Menberu
(74) *Attorney, Agent, or Firm*—Fitzpatrick, Cella, Harper & Scinto

(57) ABSTRACT

As a method of calibrating colors other than primary colors such as secondary colors, the contents of an ink color-separation table are reconstructed. However, it is difficult to reconstruct the ink color-separation table within the limitation of total ink amount permissible for a print sheet. Accordingly, a color patch corresponding to a signal value of a color to be calibrated is formed in a printer, then the signal value is calibrated based on a measured color value of the formed color patch and a target value corresponding to the signal value of the color to be calibrated, and calibration multidimensional table data is generated based on the measured color value of the formed color patch.

11 Claims, 9 Drawing Sheets

U.S. PATENT DOCUMENTS

| | | |
|---|---|---|
| 7,075,678 B2 * | 7/2006 | Ohkubo ........................ 358/1.9 |
| 7,207,645 B2 * | 4/2007 | Busch et al. ................... 347/19 |
| 2002/0021458 A1 | 2/2002 | Saito et al. .................. 358/515 |
| 2002/0031258 A1 * | 3/2002 | Namikata .................... 382/165 |
| 2002/0122209 A1 * | 9/2002 | Yoshida ....................... 358/2.1 |
| 2003/0076516 A1 | 4/2003 | Saito ........................... 358/1.9 |
| 2003/0085941 A1 * | 5/2003 | Tezuka et al. ................. 347/19 |
| 2003/0234946 A1 | 12/2003 | Saito ........................... 358/1.9 |
| 2005/0248786 A1 * | 11/2005 | Tobie et al. .................. 358/1.9 |

FOREIGN PATENT DOCUMENTS

| | | |
|---|---|---|
| JP | 2002-027265 | 1/2002 |

* cited by examiner

COLOR PROCESSING APPARATUS AND METHOD AND IMAGE PROCESSING APPARATUS

FIELD OF THE INVENTION

The present invention relates to a color processing apparatus and method and an image processing apparatus, and more particularly, to calibration to suppress variation of color reproducibility.

BACKGROUND OF THE INVENTION

FIG. 1 is a block diagram explaining conventional color-printer calibration.

An ink color-separation processor 901 performs color separation processing on input multilevel RGB image data by interpolation processing such as tetrahedral interpolation based on table information from an ink color-separation table 907, to obtain respective cyan (C), magenta (M), yellow (Y) and black (K) color component data corresponding to color materials of a color printer.

A calibration CMYK 1-dimensional look-up table (1D LUT) 902 is used for correction of tonality characteristic of image data in correspondence with color reproduction characteristics of the printer. The 1D LUT 902 is used for correcting the multilevel CMYK data outputted from the ink color-separation processor 901 to multilevel C'M'Y'K' data. By this processing, calibration in correspondence with the characteristics of the color printer is realized.

A halftone processor 903 converts the multilevel C'M'Y'K' data to data of tonality levels printable by the color printer. For example, if the color printer is a binary printer, the halftone processor 903 performs halftone processing on the C'M'Y'K' data and outputs binary C"M"Y"K" data.

A color printer engine 904 performs printing based on the input C"M"Y"K" data.

A sensor 906 examines the color reproduction characteristics of the color printer engine 904. Based on the color reproduction characteristics of the respective CMYK colors outputted from the sensor 906, a 1-dimensional LUT generator 905 generates 1D LUTs for the respective CMYK colors so as to obtain target color reproduction characteristics, and writes the generated tables into the 1D LUT 902.

In the technique using the 1D LUT 902 as shown in FIG. 1, as the respective CMYK colors are independently calibrated, high-accuracy calibration can be realized as to primary colors. However, regarding colors other than primary colors including secondary colors such as red (R), green (G) and blue (B), tertiary colors, quaternary colors constituting a gray line, and the like, high-accuracy calibration cannot be realized.

Such secondary, tertiary and quaternary colors can be calibrated by reconstructing the contents of the ink color-separation table 907. However, it is difficult to reconstruct the ink color-separation table 907 within the limitation of total ink amount permissible for a print sheet.

Further, as a recent ink-jet printer employs a 6-color ink system using pale cyan and pale magenta inks in addition to cyan, magenta, yellow and black inks, it is more difficult to keep the construction within the above limitation.

SUMMARY OF THE INVENTION

The present invention has been made so as to solve the above-described problems independently or at once, and has its object to provide a multidimensional calibration table in consideration of colors other than primary colors such as secondary colors.

According to the present invention, to attain the above-mentioned object, provided is a color processing apparatus for generating multidimensional table data for color converting image data, comprising: a former, arranged to form a color patch corresponding to a signal value of a color to be calibrated, by a printer; a proofer, arranged to calibrate the signal value based on a measured color value of the formed color patch and a target value corresponding to the signal value of the color to be calibrated; and a generator, arranged to generate the multidimensional table data for calibration based on the measured color value of the formed color patch.

Further, according to the present invention, provided is a color processing method for generating multidimensional table data for color converting image data, comprising the steps of: forming a color patch corresponding to a signal value of a color to be calibrated, by a printer; calibrating the signal value based on a measured color value of the formed color patch and a target value corresponding to the signal value of the color to be calibrated; and generating the multidimensional table data for calibration based on the measured color value of the formed color patch.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

[Construction]

Figure 1:
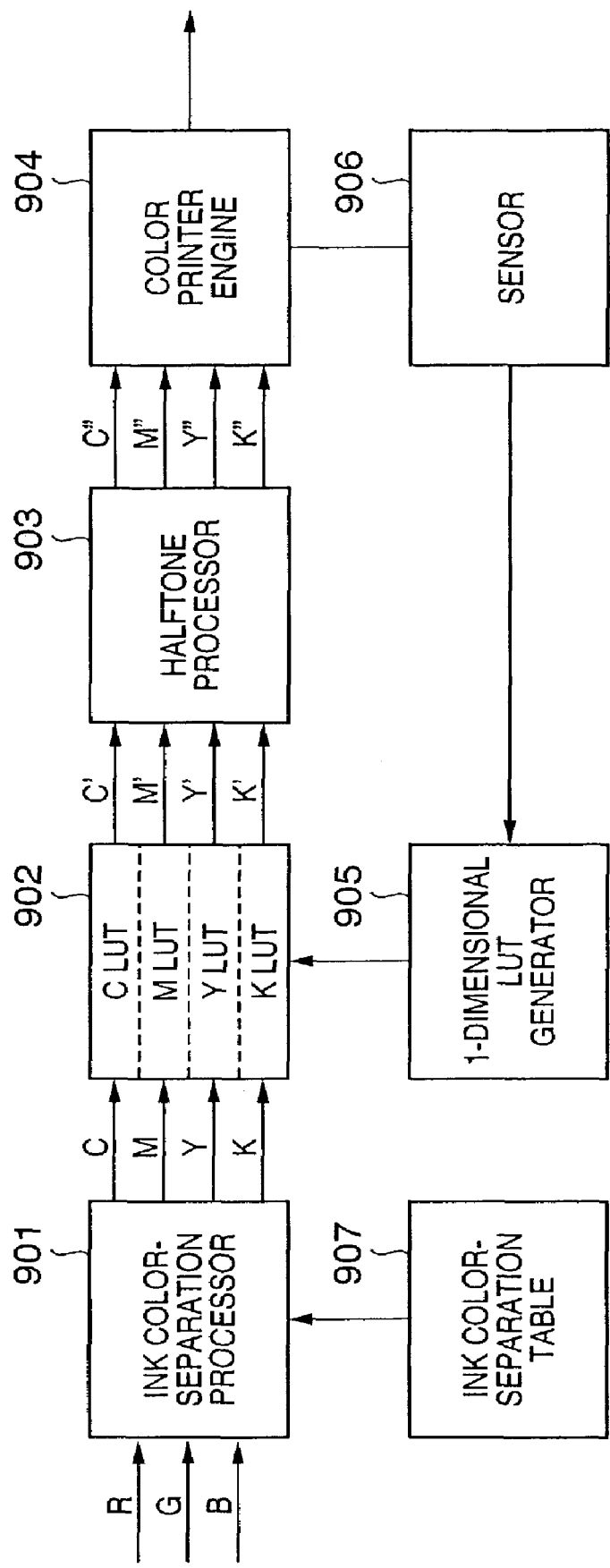
FIG. 1 is a block diagram explaining the conventional color printer calibration.
Figure 2:
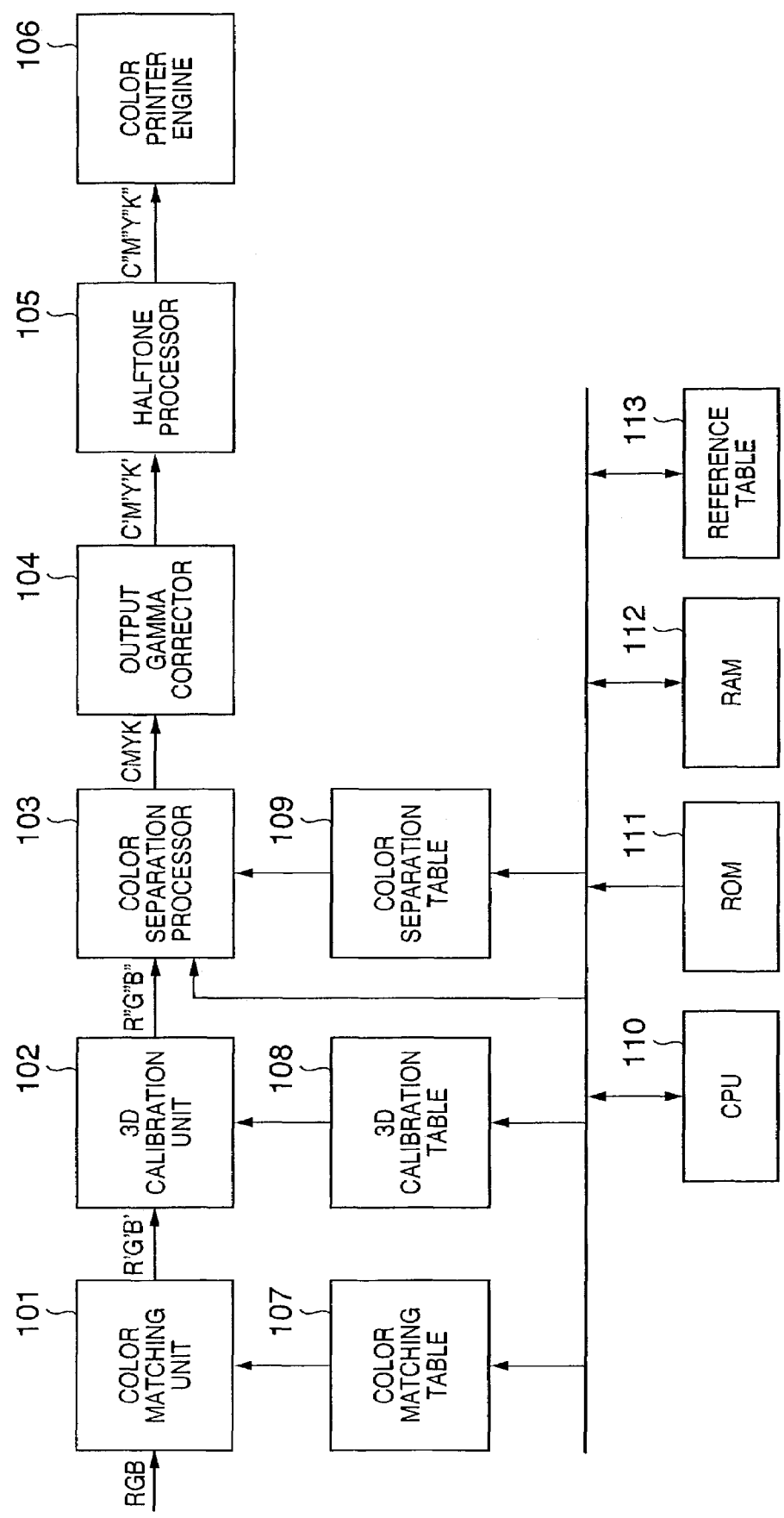
FIG. 2 is a block diagram showing the construction of an image processing apparatus according to an embodiment of the present invention.

FIG. 2 is a block diagram showing the construction of an image processing apparatus according to an embodiment of the present invention.

In FIG. 2, for matching between colors of input image data and a color reproduction characteristics of a printer, a color matching processor 101 performs color matching processing on RGB data by 3-dimensional interpolation processing such as tetrahedral interpolation or cubic interpolation based on the contents of a color matching table 107 to obtain R'G'B' data.

A 3D calibration processor 102 performs calibration processing on the R'G'B' data by 3-dimensional interpolation processing such as tetrahedral interpolation or cubic interpolation based on the contents of a 3D calibration table 108, to obtain R"G"B" data.

A color separation processor 103 performs color separation processing on the R"G"B" data by 3-dimensional interpolation processing such as tetrahedral interpolation or cubic interpolation based on the contents of a color separation table 109, to obtain CMYK data representing color material (ink) colors of the printer.

An output gamma corrector 104 corrects gamma characteristics as a combination of the content of processing by a halftone processor 105 and the characteristics of the color printer engine 106.

The halftone processor 105 performs halftone processing on multilevel C'M'Y'K' data outputted from the output gamma corrector 104 to obtain C"M"Y"K" data of tonality levels representable by the color printer engine 106.

The color printer engine 106 prints an image on a print sheet based on C"M"Y"K" data outputted from the halftone processor 105.

A CPU 110 controls the entire image processing apparatus using a RAM 112 as a work area based on a program and data stored in a ROM 111. The CPU 110 controls execution of update processing of the 3D calibration table 108 and the above-described image processing using the updated 3D calibration table 108.

A reference table 113 holds relation between R"G"B" data to form a patch to be described later and color measurement values of the patch.

In the present embodiment, tonality of colors other than secondary colors in a printed matter can be easily stabilized without such as limitation of total ink amount in the case of changing the contents of the color separation table 109 or complicated control in a 6-color ink system, by changing the contents of the 3D calibration table 108.

[Generation of 3D Calibration Table]

Figure 3:
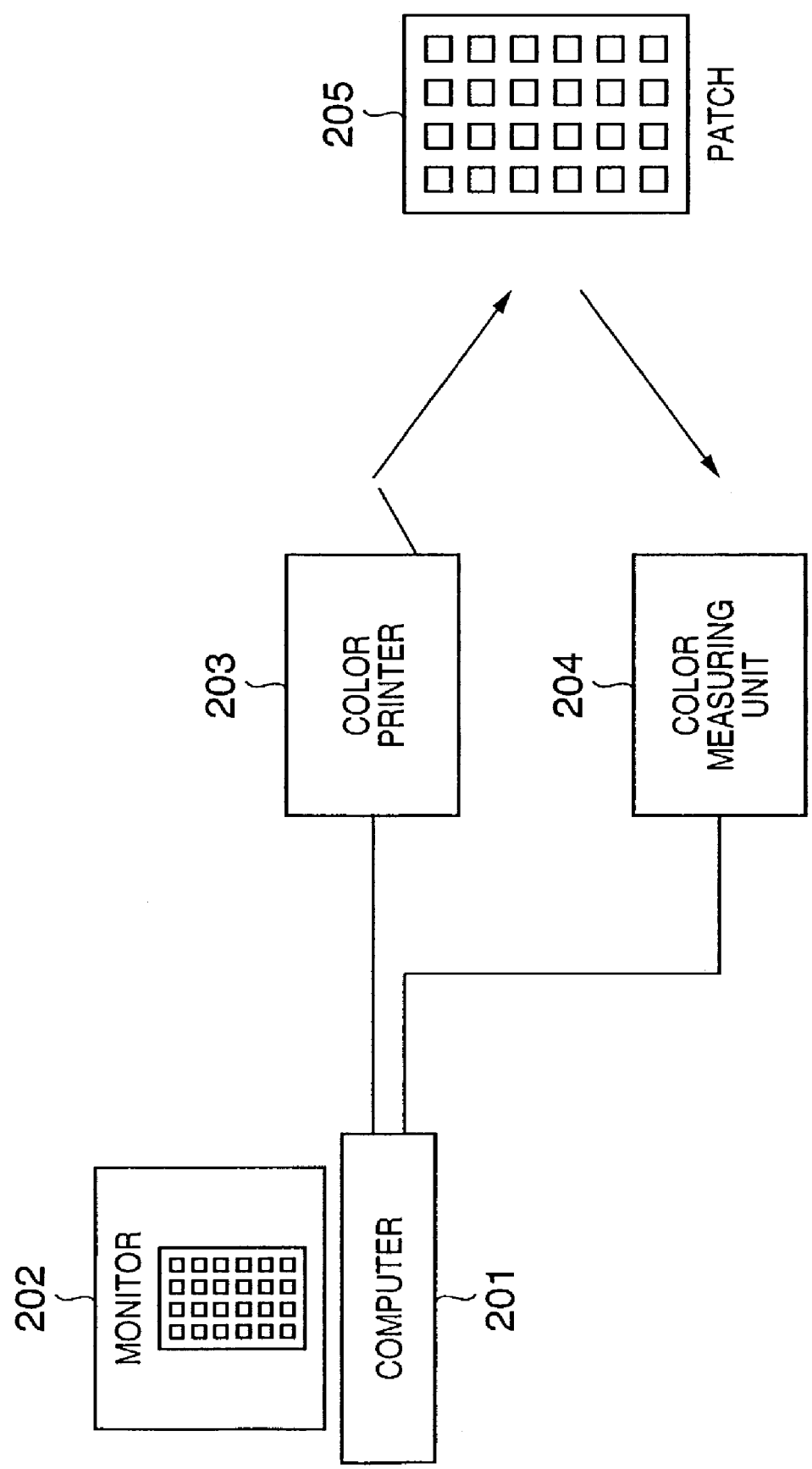
FIG. 3 is an explanatory view of generation of a 3D calibration table.

FIG. 3 is an explanatory view of generation of the 3D calibration table 108, showing a system configuration including a color printer.

In FIG. 3, a computer 201 controls a color printer 203 for image printing and a color measuring unit 204 for color measurement of a patch 205 printed by the color printer 203. A monitor 202 displays data and the like held in the computer 201. Note that the image processing apparatus of the present embodiment in FIG. 2 is incorporated in the color printer 203.

Figure 4:
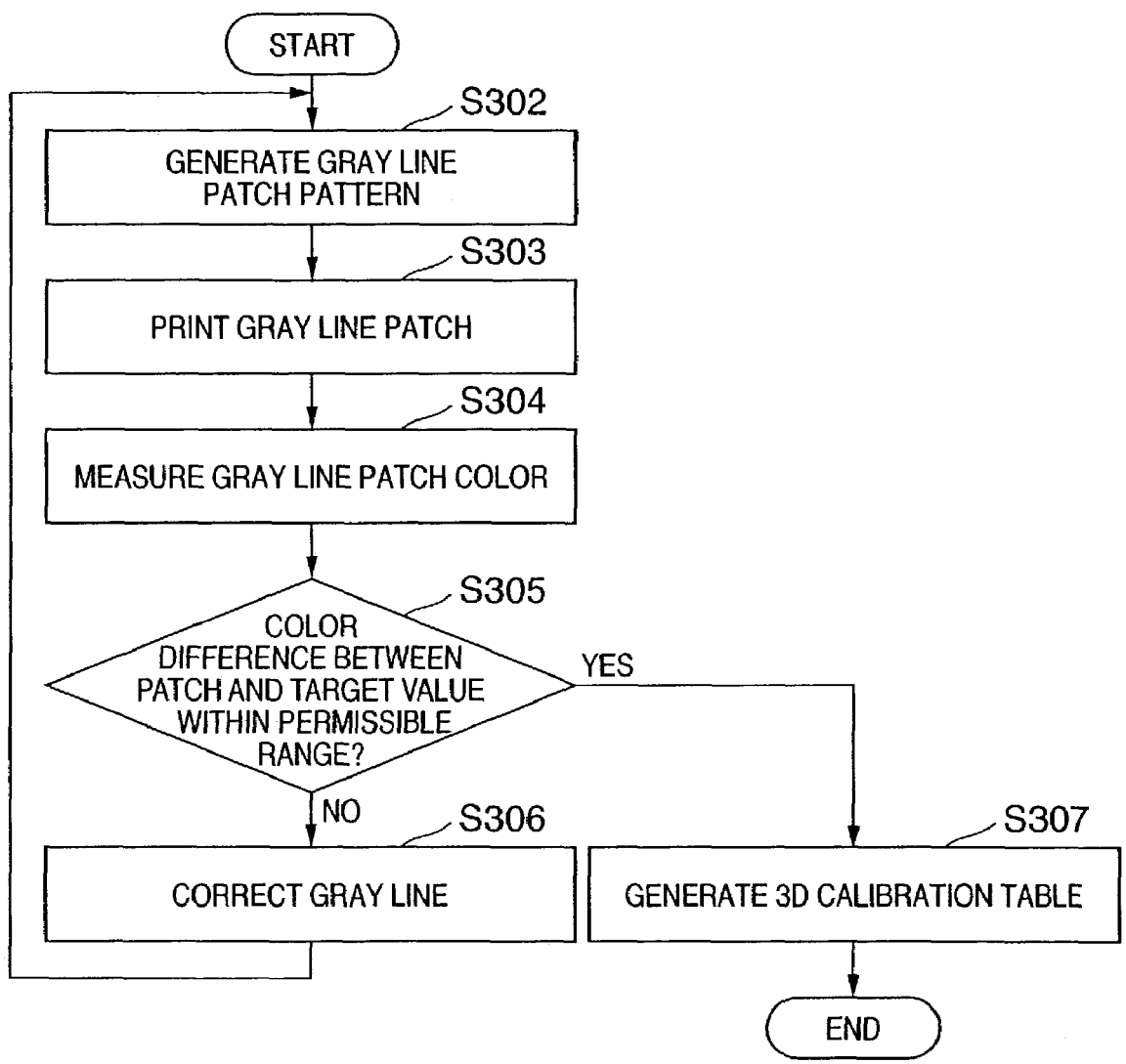
FIG. 4 is a flowchart showing calibration.

FIG. 4 is a flowchart showing calibration performed by the system as shown in FIG. 3 under the control of the computer 201.

First, the CPU 110 generates R"G"B" data corresponding to a gray line patch pattern based on the reference table 113 (S302). Next, the generated R"G"B" data is processed by the color separation processor 103, the output gamma corrector 104 and the halftone processor 105, and a gray line patch 205 is printed by the color printer 203 (S303). The printed patch 205 is color-measured by the color measuring unit 204, and the result of color measurement is transferred to the image processing apparatus in the color printer 203 (S304).

The CPU 101 calculates a color difference $\Delta E$ between the color measurement value of patch and a target value of the gray line stored in the reference table 113, and determines whether or not the color difference $\Delta E$ is within a permissible value $\epsilon$ (S305). If $\Delta E > \epsilon$ holds, the gray line is corrected (S306). The details of the correction will be described later.

Then the processing from step S302 to S304 is repeated by using the R"G"B" data corrected at step S306, and when $\Delta E \leq \epsilon$ holds, a 3D calibration table is generated by 3-dimensional interpolation using the gray line R"G"B" data at that time (S307).

Figure 5:
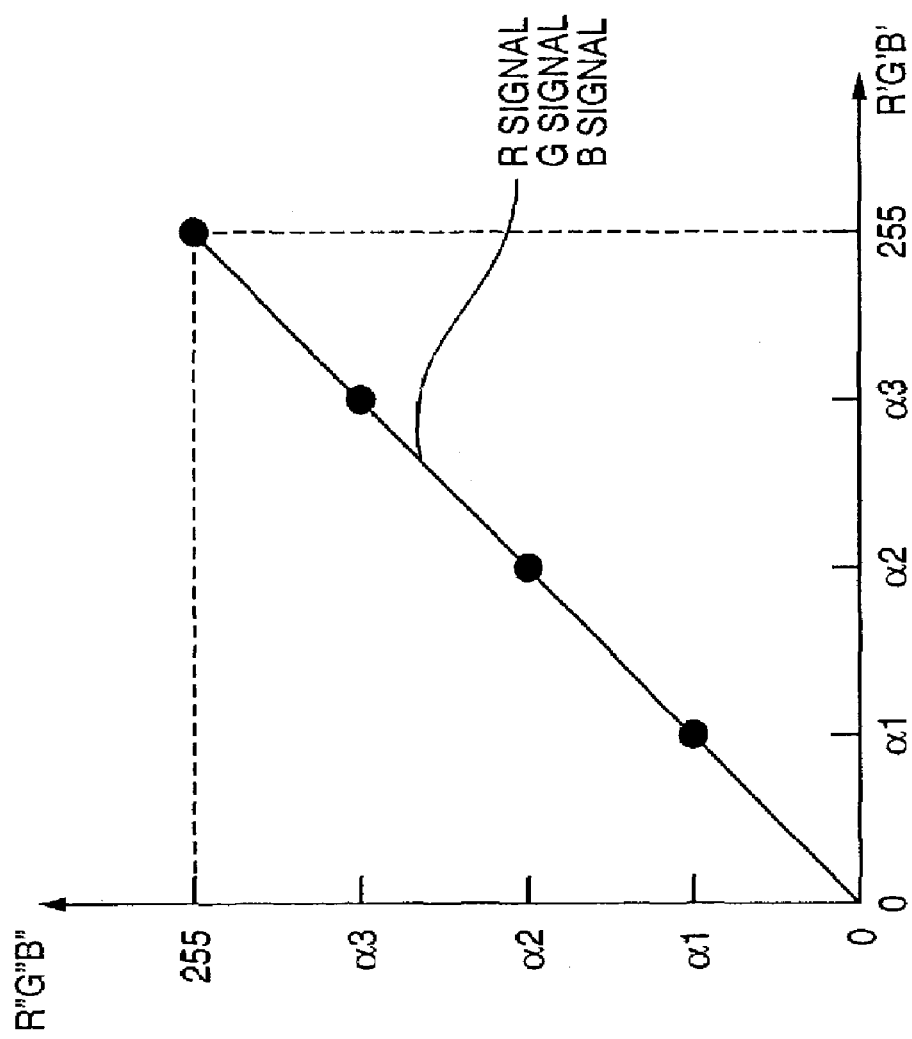
FIG. 5 is a line graph showing initial characteristics of a gray line in the 3D calibration table.

FIG. 5 shows an example of initial characteristics of the gray line in the 3D calibration table 108. That is, in the initial characteristic shown in FIG. 5, respective R, G and B characteristic curves completely overlap with each other, and output values corresponding to R', G' and B' input values $\alpha1$, $\alpha2$ and $\alpha3$ are $\alpha1$, $\alpha2$ and $\alpha3$.

Figure 6:
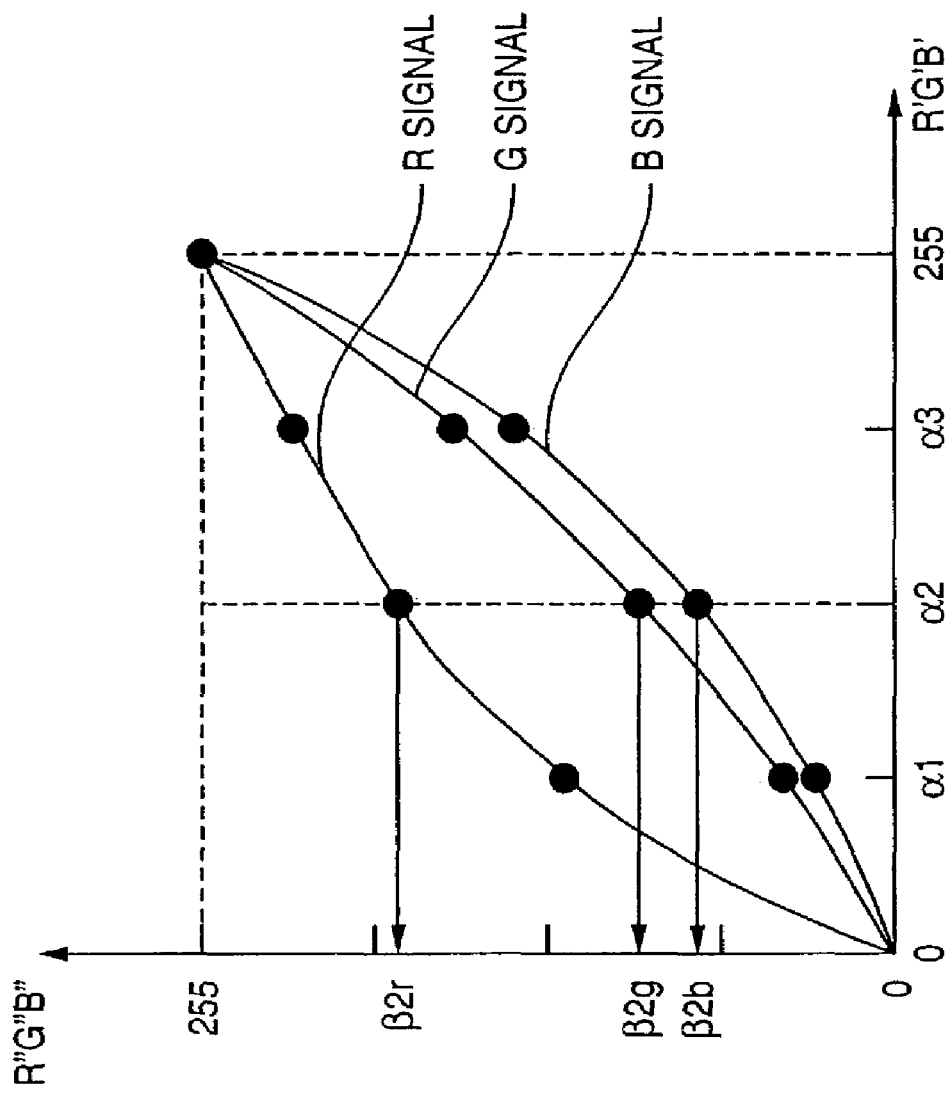
FIG. 6 is a line graph showing corrected characteristics of the gray line in the 3D calibration table.

On the other hand, FIG. 6 shows the characteristics of the corrected gray line in the 3D calibration table 108. In FIG. 6, the R signal is enhanced and G and B signals are weakened in comparison with the initial characteristics (FIG. 5). As a result, the color reproduction characteristics of the gray line of the color printer 203 are stabilized.

Figure 7:
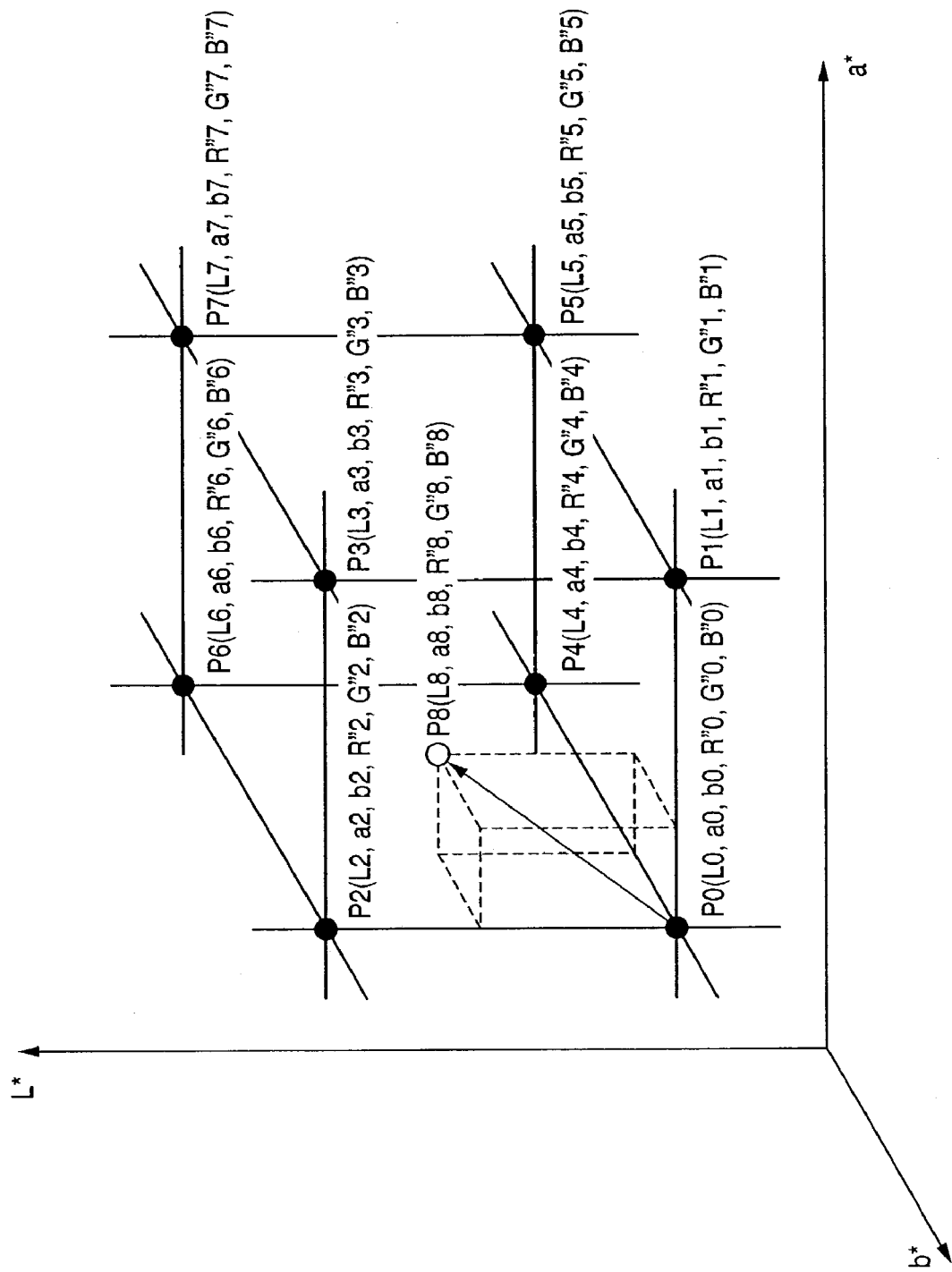
FIG. 7 is an explanatory view of an algorithm for correcting the gray line.

FIG. 7 is an explanatory view of an algorithm for correcting the gray line.

In FIG. 7, points P0 to P7 indicate gray line target values corresponding to the R"G"B" data stored in the reference table 113 and neighboring colors resulted from previous printing and color-measurement, plotted on CIE L*a*b* color space.

A point P8 indicates plotted values (L8, a8, b8) of the gray line obtained by printing a patch based on gray line signal values (R", G", B")=($\alpha2$, $\alpha2$, $\alpha2$) and performing color measurement.

Note that each point shows L*a*b* values indicating the color of the point and R"G"B" values as the basis of the point. For example, values corresponding to the point P0 are L*a*b*=(L0, a0, b0) and R"G"B"=(R"0, G"0, B"0). Note that values R"G"B"=(R"8, G"8, B"8) of the point P8 are obtained by interpolation from R"G"B" values of the peripheral points P0 to P7 pf the point P8 based on the color measurement values (L8, a8, b8).

Figure 8:
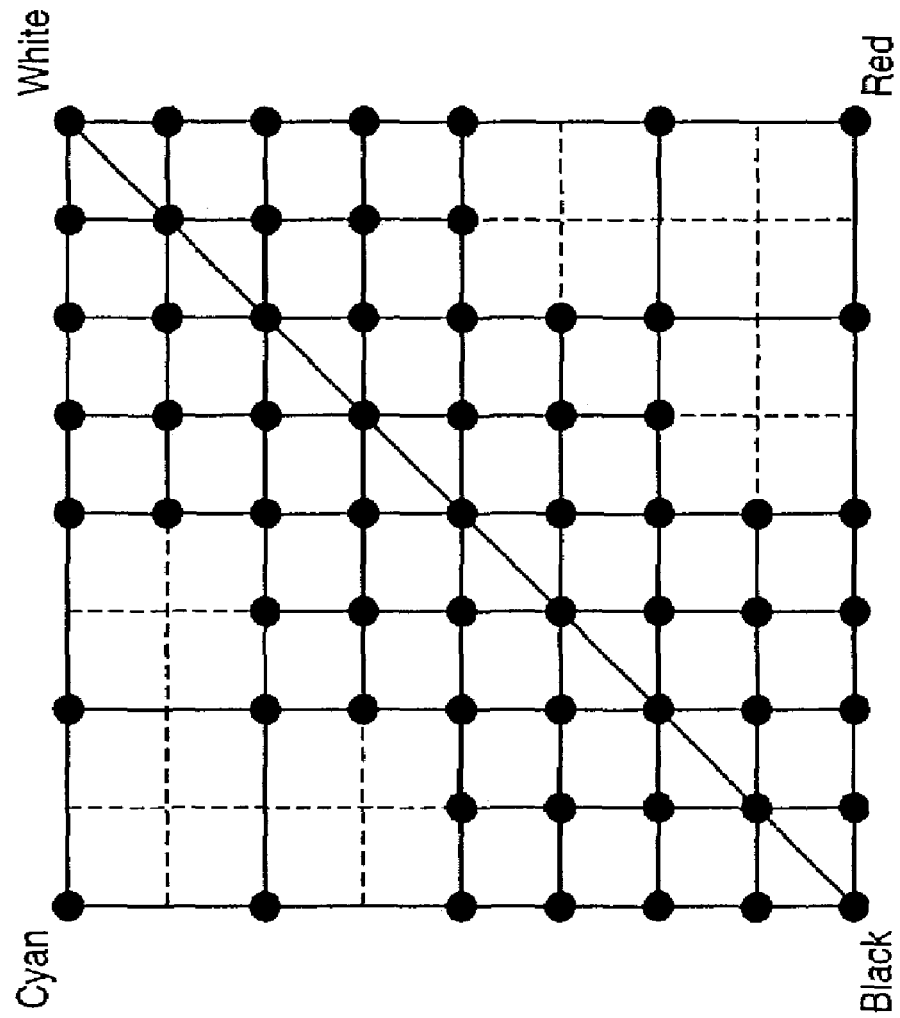
FIG. 8 is an explanatory view of a reference table.

FIG. 8 is an explanatory view of the reference table 113. Note that the reference table 113 is originally a 3-dimensional table, however, in FIG. 8, for the sake of simplicity of explanation, a gray line connecting a white point to a black point is represented as a cross section (2 dimension) passing through red and cyan.

As it is apparent from FIG. 8, in the structure of the table, the grid interval around the gray line is narrow, and that away from the gray line is wide. In this arrangement, the accuracy of color reproducibility around the gray line is improved in the same table size.

Assuming that a target value of the point P8, as a result of color measurement of gray line signal values (R", G", B")=($\alpha2$, $\alpha2$, $\alpha2$) is P0, the color difference $\Delta E$ is represented by the following expression.

$$\Delta E = \sqrt{\{(L0-L8)^2 + (a0-a8)^2 + (b0-b8)^2\}}$$

In the determination at step S305, if it is determined that the color difference $\Delta E$ exceeds the permissible value $\epsilon$, (R", G", B")=($\beta2r$, $\beta2g$, $\beta2g$) in FIG. 6 are calculated from the difference between target R"G"B" values (R"0, G"0, B"0) and R"G"B" signal values (R"8, G"8, B"8) based on color measurement values (L8, a8, b8) as follows.

$$\beta 2r = \alpha 2 + (R''0 - R''8)$$

$$\beta 2g = \alpha 2 + (G''0 - G''8)$$

$$\beta 2b = \alpha 2 + (B''0 - B''8)$$

Also, regarding the input values α1 and α3 as shown in FIG. 6, the gray line signal values can be corrected as described above.

By the above calibration processing, even if the printing characteristics of the color printer 203 have changed, the color reproduction characteristics of the gray line can be stabilized. Further, regarding peripheral colors other than the gray line, correction is performed by 3-dimensional interpolation based on the calibrated gray line and the 3D calibration table 108 is updated, thereby excellent color reproduction characteristics can be realized.

In this manner, the color tones of printed matter having other colors than primary color such as secondary colors can be easily stabilized, without limitation of total ink amount in the case of changing the contents of the color separation table 109 or complicated control in a 6-color ink system as described above, by updating the contents of the 3D calibration table 108 of the 3D calibration unit (3-dimensional LUT) 102 provided between the color matching unit 101 and the color separation processor 103.

[Modification of Embodiment]

In the above-described embodiment, the 3D calibration unit 102 is provided between the color matching unit 101 and the color separation processor 103 and 3-dimensional calibration is performed based on the contents of the 3D calibration table 108. However, the 3-dimensional calibration using a 3D calibration table is not limited to the above arrangement.

Figure 9:
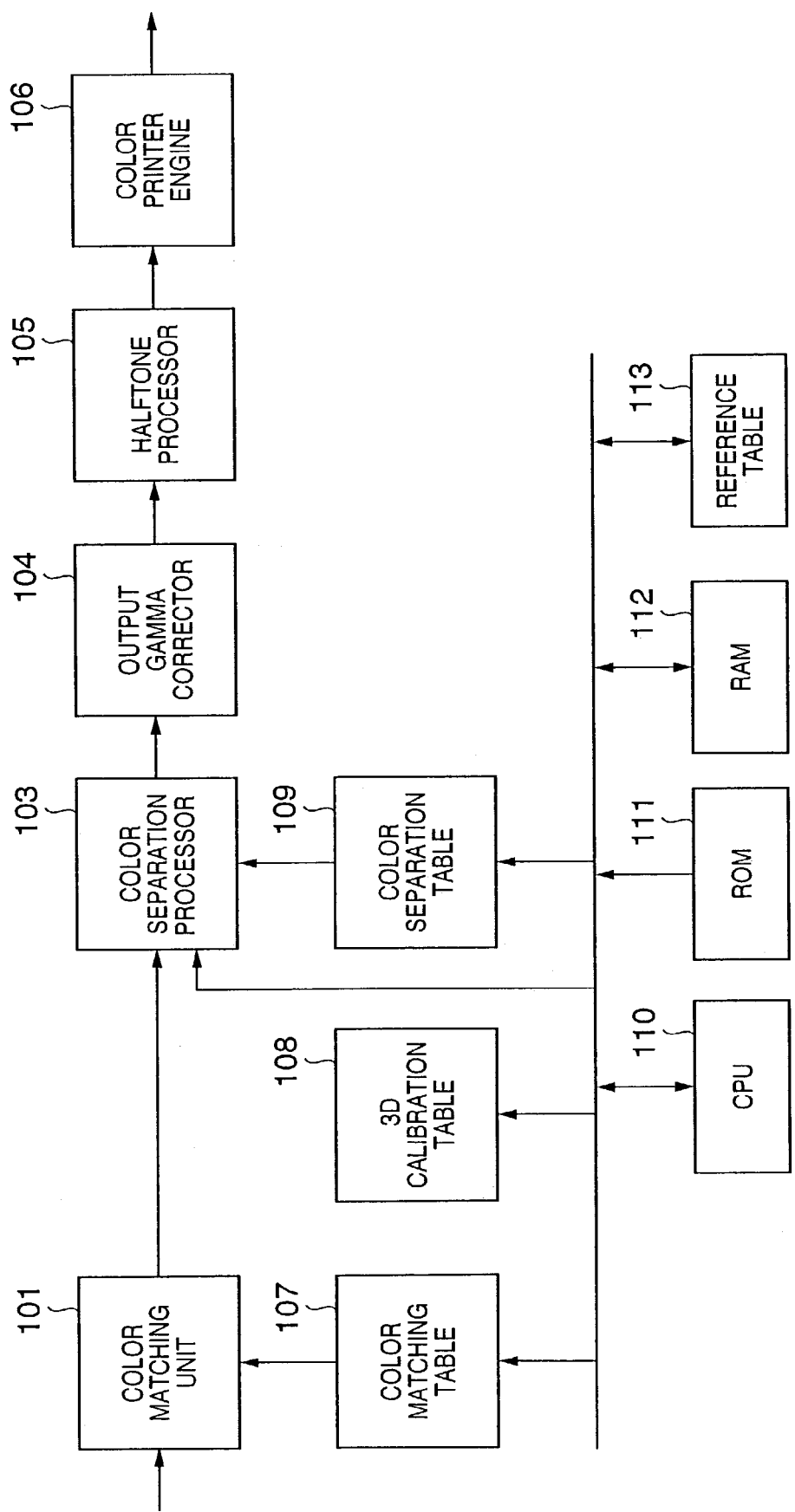
FIG. 9 is a block diagram showing another construction of the image processing apparatus according to the embodiment.

FIG. 9 is a block diagram showing another construction of the image processing apparatus, in which the color matching unit 101 and the color separation processor 103 are directly connected with each other.

In the arrangement of FIG. 9, the color matching table 107 and the 3D calibration table 108 are synthesized, and the color matching table 107 is updated based on a table resulted from the synthesizing. Otherwise, the 3D calibration table 108 and the color separation table 109 are synthesized, and the color separation table 109 is updated based on the result of synthesizing. Thus processing equivalent to that in the above-described embodiment can be realized.

Note that processing equivalent to that in the above-described embodiment can be realized by synthesizing the color matching table 107, the 3D calibration table 108 and the color separation table 109 and performing 3-dimensional interpolation processing by using a table resulted from the synthesizing.

In the above-described embodiment, when the gray line has been corrected, the 3D calibration table 108 is generated based on the corrected gray line, however, the generation of the 3D calibration table 108 is not limited to this method. It may be arranged such that a line other than the gray line, e.g., a white point-red point-black point line, or a color to be calibrated such as a flesh color is corrected, then the 3D calibration table 108 is generated by using the corrected line or color.

In the above-described embodiment, the patch 205 is color-measured by using the color measuring unit 204, however, any other machine such as a commercial flat-bed scanner can be used as long as it performs color measurement on the patch 205.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a program product holding software program code for realizing the functions of the above-described embodiment to a system or an apparatus, and executing the program code by a computer (e.g., CPU, MPU) of the system or apparatus. In this case, the program code itself held in the program product realizes the functions according to the embodiment, and the program product or storage medium constitutes the invention. Furthermore, besides aforesaid functions according to the above embodiment are realized by executing the program code by the computer, the present invention includes a case where an OS (operating system) or the like working on the computer performs a part or entire actual processing in accordance with designations of the program code and realizes the functions according to the above embodiment.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

The present invention is not limited to the above embodiment and various changes and modifications can be made within the spirit and scope of the present invention. Therefore, to appraise the public of the scope of the present invention, the following claims are made.

What is claimed is:

1. An image processing apparatus comprising:
   a former, arranged to form a color patch corresponding to a signal value of a secondary or higher-level color to be calibrated, by a printer;
   a proofer, arranged to correct the signal value when a difference between a measured color value of the formed color patch and a target value corresponding to the signal value of the secondary or higher-level color to be corrected is outside a permissible range;
   a generator, arranged to generate a multidimensional table for calibration based on the measured color value of the formed color patch when the difference is within the permissible range;
   a calibrator, arranged to perform the calibration of image data using the multidimensional table, wherein the image data can represent primary colors, each of which is reproduced by one color material, and secondary and higher-level colors, each of which is reproduced by a plurality of color materials; and
   a color separator, arranged to perform color separation processing on the calibrated image data using a color separation table to generate image data representing the amount of the color materials of the printer,
   wherein the color separation table has been generated in consideration of a limitation on the total amount of the color materials when the printer prints the secondary or higher-level color, and the multidimensional table can be generated without consideration of that limitation.

2. The apparatus according to claim 1, further comprising a controller arranged to control the correction by said proofer and formation of the color patch corresponding to the corrected signal value, based on comparison between the measured color value and the target value.

3. The apparatus according to claim 1, wherein said proofer calculates the signal value corresponding to the measured color value by interpolation, and corrects the signal value forming the color patch based on the calculated signal value.

4. The apparatus according to claim 1, wherein said former and said proofer perform processing corresponding to a color patch of a gray line, and wherein said generator generates the multidimensional table corresponding to the gray line and a color other than the gray line, based on a measured color value of the color patch of the gray line.

5. The apparatus according to claim 1, further comprising a synthesizer arranged to synthesize the multidimensional table for calibration with a multidimensional table for color matching.

6. The apparatus according to claim 1, further comprising a synthesizer arranged to synthesize the multidimensional table for calibration with the color separation table.

7. An image processing method comprising the steps of:
forming a color patch corresponding to a signal value of a secondary or higher-level color to be calibrated, by a printer;
correcting the signal value when a difference between a measured color value of the formed color patch and a target value corresponding to the signal value of the secondary or high level color to be corrected is outside a permissible range;
generating a multidimensional table for calibration based on the measured color value of the formed color patch when the difference is within the permissible range;
performing the calibration of image data using the multidimensional table, wherein the image data can represent primary colors, each of which is reproduced by one color material, and secondary and higher-level colors, each of which is reproduced by a plurality of color materials; and
performing color separation processing on the calibrated image data using a color separation table to generate image data representing the amount of the color materials of the printer,
wherein the color separation table has been generated in consideration of a limitation on the total amount of the color materials of the printer, and the multidimensional table can be generated without consideration of that limitation.

8. The method according to claim 7, further comprising the step of controlling the correction in the correcting step and the formation of the color patch corresponding to the corrected signal value in the forming step, based on comparison between the measured color value and the target value.

9. The method according to claim 7, further comprising the step of synthesizing the multidimensional table for calibration with a multidimensional table for color matching.

10. The method according to claim 7, further comprising the step of synthesizing the multidimensional table for calibration with the color separation table.

11. A computer-readable medium storing a computer-executable program for causing a computer to perform an image processing method, the method comprising the steps of:
forming a color patch corresponding to a signal value of a secondary or higher-level color to be calibrated, by a printer;
correcting the signal value when a difference between a measured color value of the formed color patch and a target value corresponding to the signal value of the secondary of higher-level color to be corrected is outside a permissible range;
generating a multidimensional table for calibration based on the measured color value of the formed color patch when the difference is within the permissible range;
performing the calibration of image data using the multidimensional table, wherein the image data can represent primary colors, each of which is reproduced by one color material, and secondary and higher-level colors, each of which is reproduced by a plurality of color materials; and
performing color separation processing on the calibrated image data to generate image data representing the amount of the color materials of the printer,
wherein the color separation table has been generated in consideration of a limitation on the total amount of the color materials of the printer and the multidimensional table can be generated without consideration of that limitation.

* * * * *